(12) United States Patent
Hill

(10) Patent No.: US 10,309,097 B2
(45) Date of Patent: Jun. 4, 2019

(54) ADJUSTABLE TIE ASSEMBLY FOR STRUCTURAL MEMBERS

(71) Applicant: Oz-Post International, LLC, Richardson, TX (US)

(72) Inventor: Ian A. Hill, Plano, TX (US)

(73) Assignee: Oz-Post International, LLC, Richardson, TX (US)

( * ) Notice: Subject to any disclaimer, the term of this patent is extended or adjusted under 35 U.S.C. 154(b) by 0 days.

(21) Appl. No.: 15/792,229

(22) Filed: Oct. 24, 2017

(65) Prior Publication Data

US 2019/0119905 A1 Apr. 25, 2019

(51) Int. Cl.
| | |
|---|---|
| E04B 1/19 | (2006.01) |
| E04B 1/41 | (2006.01) |
| E04F 10/08 | (2006.01) |
| E04B 1/26 | (2006.01) |
| A47G 29/00 | (2006.01) |
| A47G 23/02 | (2006.01) |
| E04B 1/32 | (2006.01) |

(52) U.S. Cl.
CPC ............. *E04B 1/40* (2013.01); *A47G 29/00* (2013.01); *E04B 1/2608* (2013.01); *E04F 10/08* (2013.01); *A47G 23/0216* (2013.01); *A47G 23/0266* (2013.01); *E04B 1/32* (2013.01); *E04B 2001/2644* (2013.01)

(58) Field of Classification Search
CPC .... E04B 1/40; E04B 2001/405; E04B 1/1903; E04B 2001/2403; E04B 1/2608; E04B 1/32; E04B 2001/2644; E04B 2001/2415; E04G 23/02; A47G 29/00; A47G 213/0216; A47G 23/0266

USPC .................................................. 52/465, 514
See application file for complete search history.

(56) References Cited

U.S. PATENT DOCUMENTS

| | | | | |
|---|---|---|---|---|
| 3,885,084 A | * | 5/1975 | Kaiserswerth | H05K 9/0016 174/371 |
| 4,075,811 A | * | 2/1978 | Keith | E04B 7/22 52/395 |
| 4,733,986 A | * | 3/1988 | Kenning | E04B 1/5812 403/306 |
| 4,833,853 A | * | 5/1989 | Deibele | E04D 5/142 52/410 |
| 5,003,743 A | * | 4/1991 | Bifano | E04F 13/06 52/288.1 |
| 5,573,354 A | * | 11/1996 | Koch | E02D 5/60 405/216 |
| 6,023,899 A | * | 2/2000 | Mecozzi | E04B 1/617 52/396.04 |

(Continued)

*Primary Examiner* — Beth A Stephan
(74) *Attorney, Agent, or Firm* — Foley & Lardner LLP

(57) ABSTRACT

In an embodiment, an assembly includes a first plate comprising a first primary portion and a first flange disposed orthogonally to the first primary portion. The first primary portion is configured to contact a first structural member and the first flange defining a first through hole. A second plate comprises a second primary portion and a second flange disposed orthogonally to the second primary portion. The second primary portion is configured to contact a second structural member and the second flange defines a second through hole. A cover receives the first and second flanges. A bolt is received through the first through hole, and tightening the bolt tends to draw the second plate towards the first plate.

13 Claims, 9 Drawing Sheets

(56) References Cited

U.S. PATENT DOCUMENTS

| | | | | |
|---|---|---|---|---|
| 6,287,045 B1* | 9/2001 | Ledingham | ........ | B65G 21/2072 |
| | | | | 198/836.1 |
| 6,313,405 B1* | 11/2001 | Rinderer | .............. | H02G 3/0456 |
| | | | | 174/68.3 |
| 8,459,604 B2* | 6/2013 | Smith | ................... | H02G 3/0608 |
| | | | | 248/300 |
| 9,540,801 B2 | 1/2017 | Hill | | |
| 2013/0340375 A1* | 12/2013 | Hill | ....................... | E04B 1/1903 |
| | | | | 52/655.1 |
| 2016/0097209 A1* | 4/2016 | Angelo | .............. | E04G 23/0229 |
| | | | | 52/297 |

* cited by examiner

ADJUSTABLE TIE ASSEMBLY FOR STRUCTURAL MEMBERS

BACKGROUND OF THE INVENTION

Technical Field of the Invention

The present invention relates generally to a connection of structural members, such as two members forming an arched rafter and, in particular, to an ornamental assembly configured to be exposed in outdoor constructions.

Description of Related Art

Conventional structural connection members are made of stamped galvanized steel and thus possess a utilitarian appearance driven by functional configuration. In most installations, the connection members and hardware are hidden from view by the roofing and siding of the structure, and thus the galvanized utilitarian look of the connectors is of no concern. Also, most conventional connectors for structural members are not adjustable, and thus the forcers exerted on the structural members by the connectors may change if the structural members settle or otherwise shift from their initially constructed configuration.

Oftentimes, the construction project is outdoors, and the hardware used to connect structural members may not be concealed. Examples of such outdoor construction include pergolas and gazebos. In these types of constructions, the hardware connecting structural members may be powder coated one color or shade and form a substantial part of the appearance of the overall structure. In addition, exposed rafters are of interest in many architectural designs, especially those designs mimicking old world craftsmanship. For example, exposed rafters are a common feature of Tudor constructions or constructions needing a vaulted or cathedral ceiling.

SUMMARY

In an embodiment, an assembly includes a first plate comprising a first primary portion and a first flange disposed orthogonally to the first primary portion. The first primary portion is configured to contact a first structural member and the first flange defining a first through hole. A second plate comprises a second primary portion and a second flange disposed orthogonally to the second primary portion. The second primary portion is configured to contact a second structural member and the second flange defines a second through hole. A cover receives the first and second flanges. A bolt is received through the first through hole, and tightening the bolt tends to draw the second plate towards the first plate. The assembly may be used to joint two structural members and allow adjustment of the forces exerted on such structural members, or the assembly may be used to surround a single structural member, such as a support post. The forces exerted on the support post by the assembly is also adjustable.

According to one embodiment, the cover may be secured to conceal the flanges by a bolt. According to another embodiment, the cover may be secured to conceal the flanges by a clip. The cover may also support a variety of interchangeable accessories.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
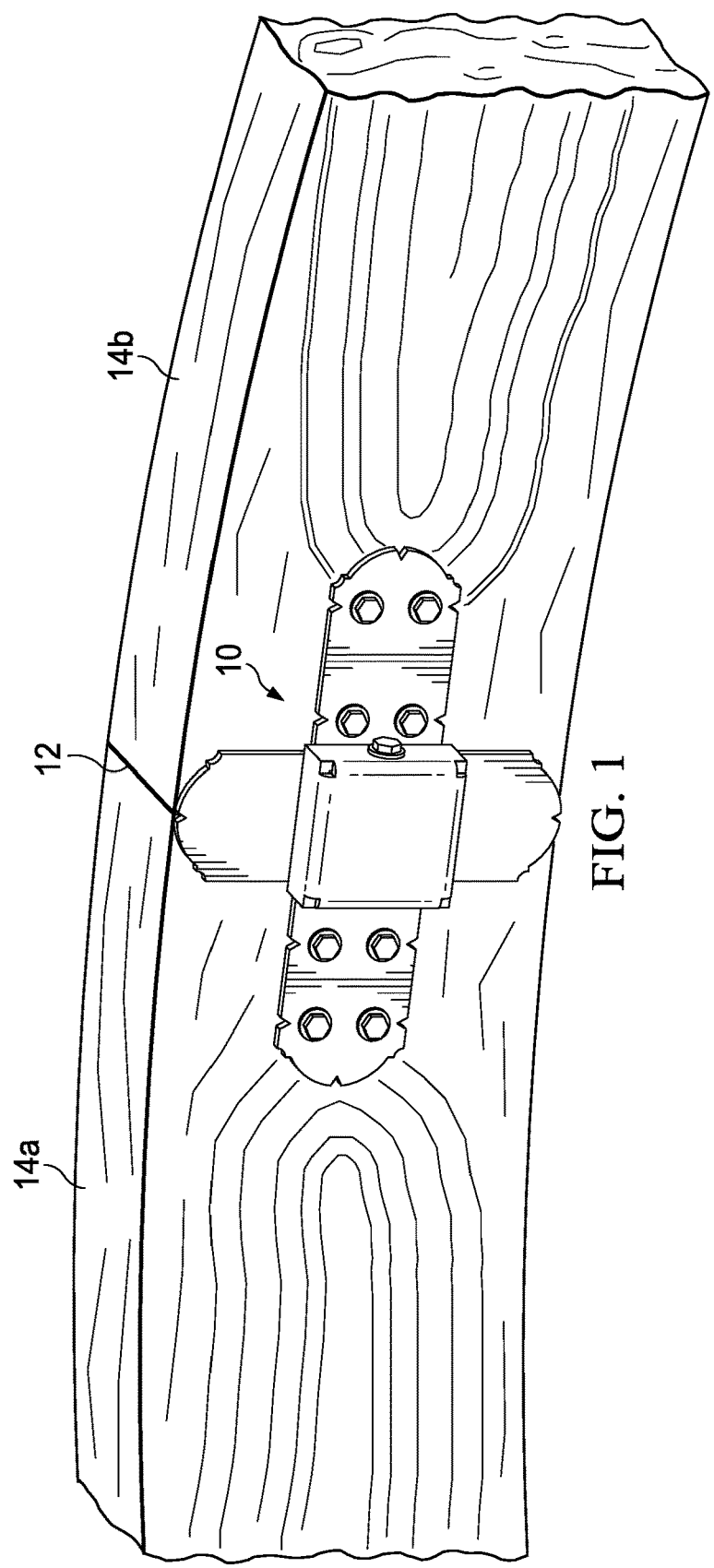
FIG. 1 is an isometric, environmental view of an adjustable tie assembly connecting two structural members.

FIG. 1 is an environmental view of an adjustable tie assembly 10 securing a butt joint 12 between two structural members 14a, 14b. The structural members 14a, 14b may be rafters of a roof structure, for example a roof of a pergola. The rafters are joined at the butt joint 12 in order to create an arched rafter that spans a greater distance than the distance spanned by cutting standard sized lumber, for example a two-by-six standard piece of lumber, into an arch-shape. As described in more detail below, the adjustable tie assembly 10 allows a user to tighten or loosen the butt joint 12. Moreover, the adjustable tie assembly 10 provides an ornamental design that can be incorporated to the overall style of the construction, particularly an outdoor construction, such as a gazebo or pergola.

Figure 2:
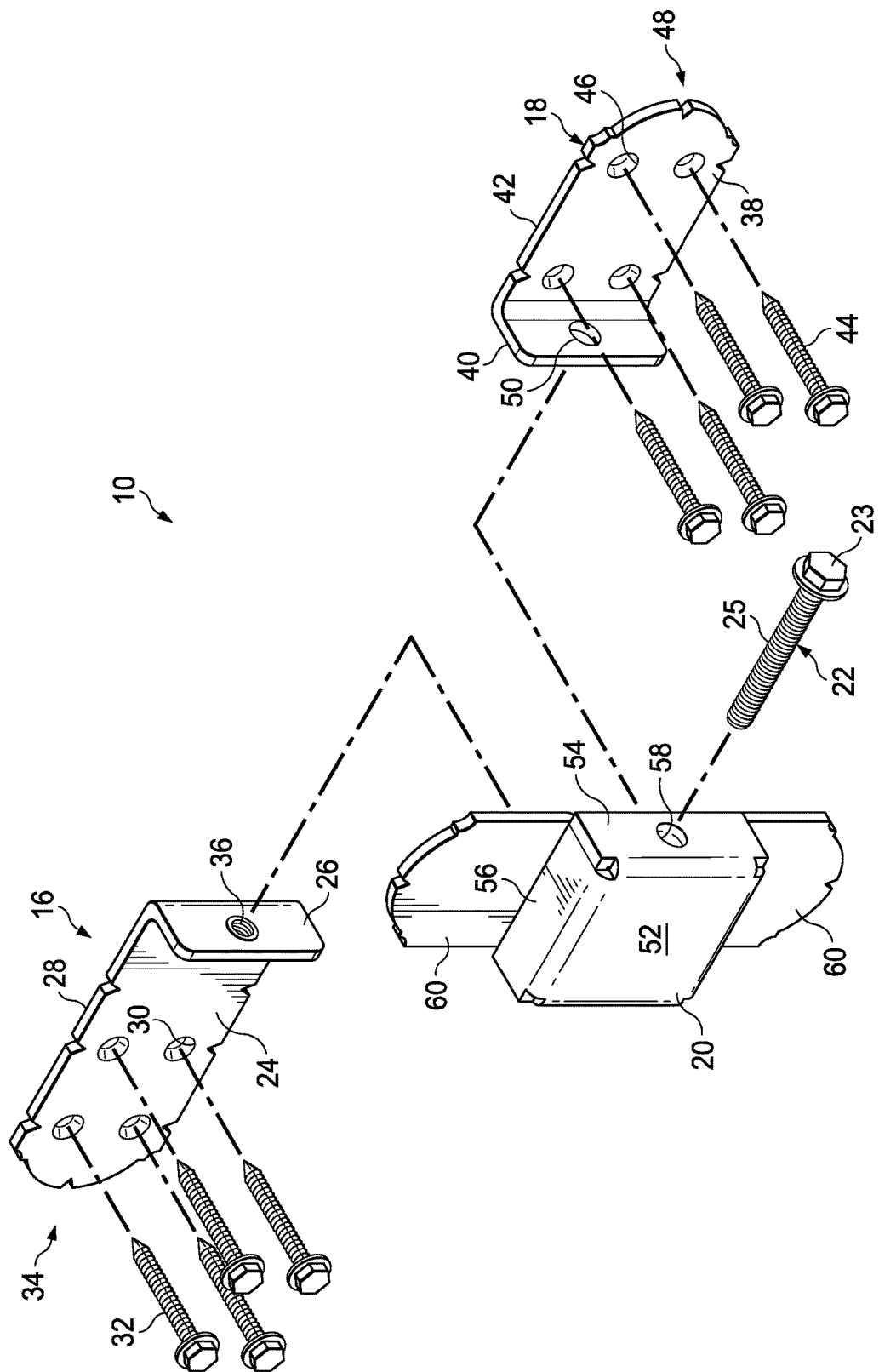
FIG. 2 is an isometric, partially exploded view of the adjustable tie assembly shown in FIG. 1.

FIG. 2 illustrates and exploded view of the adjustable tie assembly 10 shown in FIG. 1. The adjustable tie assembly includes a first tie plate 16, a second tie plate 18, and a cover 20. A bolt 22 is received through the cover 20, the first tie plate 16, and the second tie plate 18. The bolt includes a head 23 and a threaded shaft 35 extending from the head 23. Tightening or loosening the bolt 22 tightens or loosens the butt joint 12, i.e. increases or decreases a compression force holding the two structural members 14a, 14b in abutment.

The first tie plate 16 is generally L-shaped and includes a primary portion 24 and a flange 26 disposed generally orthogonally to the primary portion 24. A rear surface 28 of the primary portion 24 contacts the structural member 14a. The primary portion 24 defines a plurality of through holes 30, for example four through holes 30, through which fasteners 32 are received to attach the first tie plate 16 to the structural member 14a. The fasteners 32 may be any fastener suitable for the material of the structural member 14a. For example, a wood screw with a hex head may be received through each of the through holes 30 in the primary portion 24. A distal end 34 of the primary portion 24 disposed opposite the flange 26 may be formed to have an ornamental shape. The flange 26 includes a threaded through hole 36 disposed at the center of the flange 26 that is configured to engage the threads of the bolt 22 to allow the butt joint 12 to be tightened or loosened.

The second tie plate 18 includes many of the same features as the first tie plate 16, with the exception of the threaded through hole in the flange. Rather, the second tie plate 18 includes a non-threaded through hole. The second tie plate 18 is generally L-shaped and includes a primary portion 38 and a flange 40 bent approximately 90 degrees from the primary portion 38. A rear surface 42 of the primary portion 38 contacts the structural member 14b, and the tie plate 18 is secured to that structural member 14b by fasteners 44 received through a plurality of through holes 46, for example four, formed in the primary portion 38 of the tie plate 18. The fasteners 44 may be any fastener suitable for the material of the structural member 14b. For example, a wood screw with a hex head may be received through each of the through holes 46 in the primary portion 38. A distal end 48 of the primary portion 38 opposite the flange 40 may be formed to have an ornamental shape. The flange 40 includes a through hole 50 that is configured to receive the shaft of the bolt 22.

The cover 20 is disposed over the flange 26 of the first tie plate 16 and the flange 40 of the second tie plate 18. The cover 20 is a hollow, open box-like structure and the flanges 26, 40 are received in the hollow box. The cover 20 includes and a top wall 52, two side walls 54, and two end walls 56. The side walls 54 and the end walls 56 form a perimeter of the cover 20. A through hole 58 is formed in one of the side walls 54 to receive the bolt 22. The bolt 22 is received through the through hole 58 in the side wall 54 of the cover 20, through the through hole 50 in the second tie plate 18, and is received in threaded engagement with the threaded through hole 36 in the flange 26 of first tie plate 16. The shaft 25 is concealed by the cover 20, and the head 23 remains outside of the cover The bolt 22 may be a hex head bolt with a washer component that may be integral to the bolt or may be separate. The bolt 22 is rotated to contact the side wall 54 of the cover 20, and then further rotation of the bolt 22 will tend to draw the first tie plate 16, and thus the structural member 14a to which it is attached toward the second tie plate 18 and thus the structural member 14b to which it is attached. In this manner, the compressive force at the butt joint 12 of the two structural members 14a, 14b is increased. This adjustable increase in compressive force is beneficial if the structure settles or otherwise shifts over its useful life. Similarly, the bolt 22 may be loosened to relax the compressive force on the butt joint 12.

According to certain embodiments, the cover includes a pair of ornamental flanges 60, each extending from an end wall 56 cover 20. The ornamental flanges 60 are bent to extend perpendicularly from a respective end wall 56. The cover ornamental flanges 60 together with the primary portions 24, 38 of the tie plates 16, 18 give the adjustable tie assembly 10 a cross-type appearance. The end portions of the cover flanges 60 may have an ornamental design similar to the ornamental design of the end portions 34, 48 of the tie plates 16, 18. According to an alternate embodiment, the cover flanges 60 may be omitted.

The tie plates 16, 18 and the cover 20 may be made from any suitable material, such as a metallic or polymeric material. According to one embodiment, the tie plates 16, 18 and the cover 20 are formed of steel sheet cut in a desired pattern and shaped, for example by bending or stamping, into a desired shape. The steel may coated by painting or powder coating. The surface may be smooth or distressed. Alternatively, the tie plates 16, 18 and the cover 20 may cast or otherwise molded.

Figure 3:
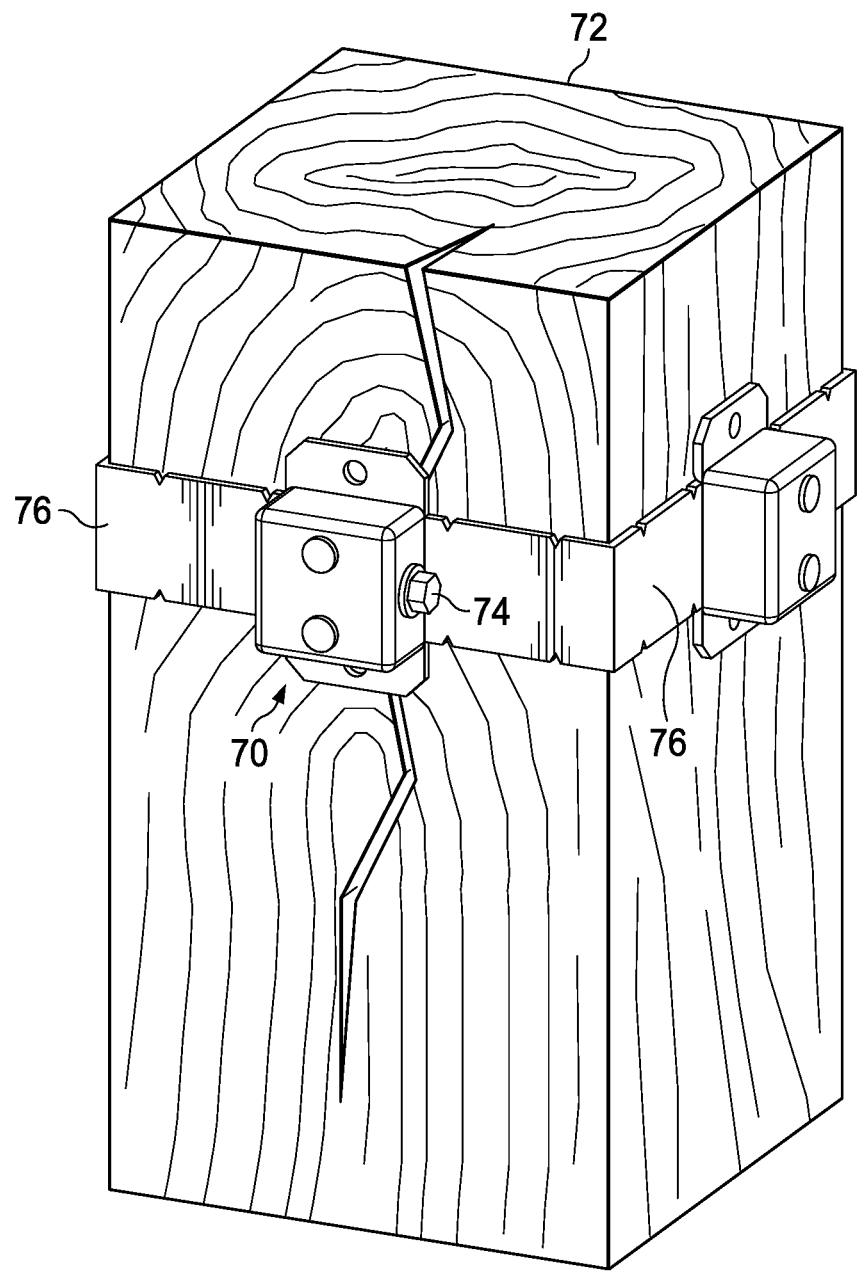
FIG. 3 is an isometric, environmental view of an adjustable post band surrounding a support post.
Figure 4:
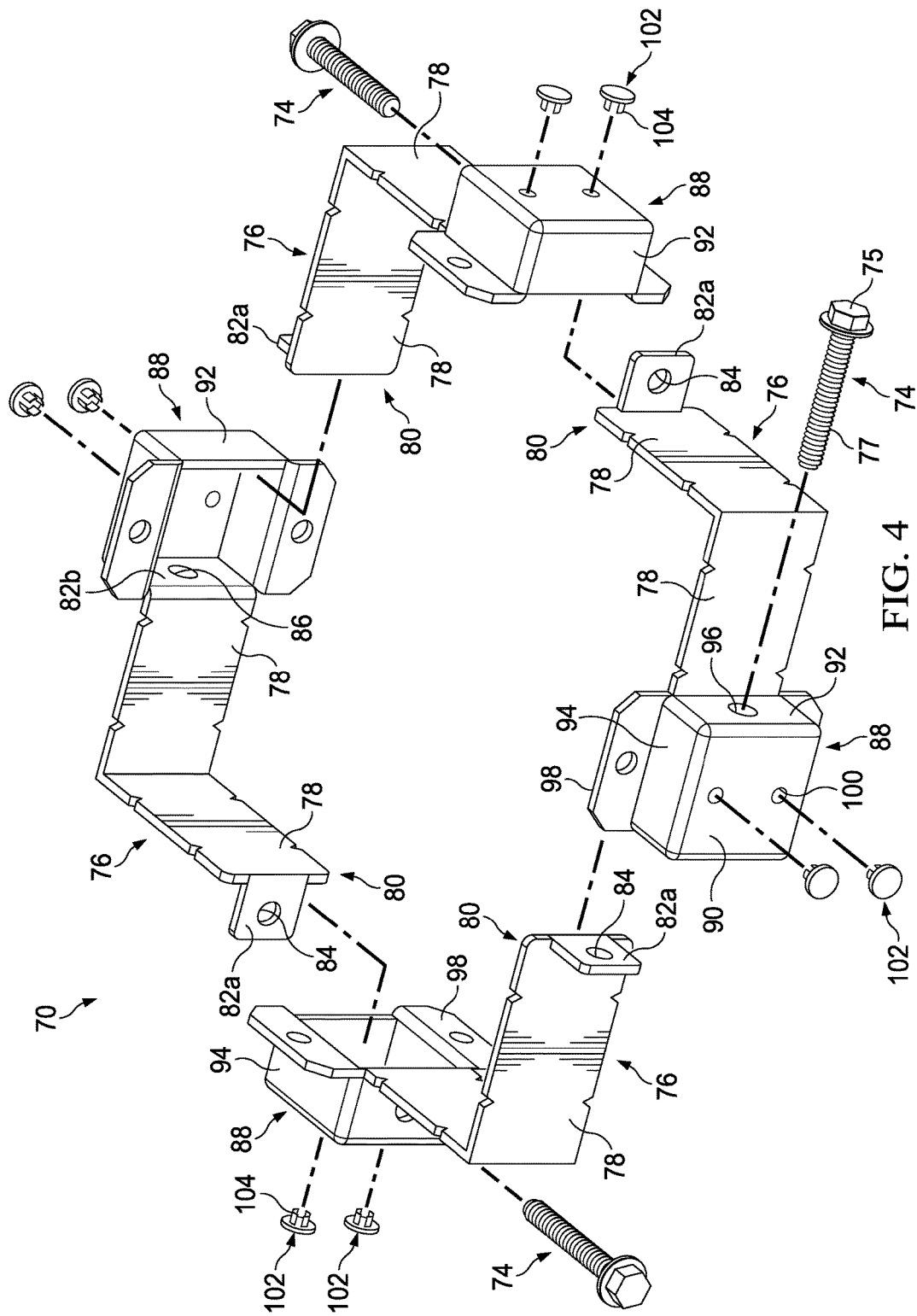
FIG. 4 is an isometric, partially exploded view of the adjustable post band shown in FIG. 3.

Reference is made to FIGS. 3 and 4, which illustrate an isometric environmental view and exploded view, respectively, of an adjustable post band 70 according to the teachings of the present disclosure. The adjustable post band 70 may be used to compress a structural post member 72, for example a six inch-by-six inch support post 72 for a pergola. Tightening one or more of the bolts 74 of the adjustable post band 70 increases or decreases compression on the structural post 72. The bolts each include a head 75 and threaded shaft 77 extending from the head 75. Increasing compression on the support post 72 may be beneficial if the post develops a crack due to lack of moisture or otherwise. Similarly, loosening one or more bolts 74 reduces the compression on the support post created by the adjustable band 70.

The adjustable post band 70 includes four band plates 76. Each band plate 76 includes a primary portion 78 that is bent 90 degrees between distal ends 80. The band plate 76 is sized such that the primary portion contacts a portion of adjacent faces of the support post 72, with the bend contacting an edge at the intersection of one face of the support post 72 with an adjacent face. Any suitable size band plate to accommodate a correspondingly sized support post 72 is contemplated by this disclosure. According to one embodiment, the bend may not be equidistant from each distal end 80. Even though the individual band plates 76 are not symmetrical, the assembled adjustable post band 70 appears symmetrical, and each cover 88 is positioned approximately equidistant from opposing edges of a face of the support post 72. According to an alternate embodiment, the band plate 76 may be arcuate to form a semicircular shape and a pair of band plates are sized and shaped to circumferentially surround a support post having a circular cross section.

A flange 82a, 82b extends from respective distal ends 80 and are bent or otherwise disposed to be orthogonal to the distal end 80 of the primary portion 78 from which it extends. A through hole 84 is formed through the flange 82a, and a through hole 86 is formed through the flange 82b. According to one embodiment, the through hole 84 is threaded and the through hole 86 is non-threaded. The bolt 74 is received through the non-threaded through hole 86 of that flange 82b and engages the threads of the through hole 84 of an adjacent band plate 76. Four band plates 76 are sized to wrap around the support post 72 and to leave a gap between the flange 82a of one band plate 76 and the flange 82b of an adjacent band plate 76.

A cover 88 is positioned over adjacent flanges 82a, 82b of adjacent band plates 76. The cover 88 has a generally open box-shape with a hollow interior. The flanges 82a, 82b of adjacent band plates 76 are received in the hollow box. The cover 88 includes and a top wall 90, two side walls 92, and two end walls 94. The side walls 92 and the end walls 94 form a perimeter of the cover 88. A through hole 96 is formed in one of the side walls 92 to receive the bolt 74. The bolt 74 is received through the through hole 96 in the side wall 92 of the cover 88, through the through hole 86 in one band plate 76, and is received in threaded engagement with the threaded through hole 84 in the flange 82*a* of the adjacent band plate 76. The cover 88 conceals the shaft 77 of the bolt 74, and the head 75 remains outside of the cover 72. The bolt 74 may be a hex head bolt with a washer component that may be integral to the bolt or may be separate. The bolt 74 is rotated to contact the side wall 92 of the cover 88, and then further rotation of the bolt 74 will tend to draw the band plate 76 that is in threaded engagement with the bolt 74 toward the adjacent band plate 76, and thus the structural post 72 is partially compressed. Adjusting of any one or more of the four bolts 74 creates compressive forces on faces of the support post 72. In this manner, the compressive force on the support post 72 is increased. This adjustable increase in compressive force may more evenly compress the post 72, which may be beneficial if the post develops a crack, void, or other structural or aesthetic imperfection. Similarly, the bolts 74 may be loosened to relax the compressive force on the support post 72.

According to certain embodiments, the cover 88 includes a pair of ornamental flanges 98, each extending from an end wall 94 of the cover 88. The ornamental flanges 98 are bent to extend perpendicularly from a respective end wall 94. The cover flanges 98 may include a through hole to receive a fastener, and the cover flanges 98 may have any suitable ornamental shape. According to an alternate embodiment, the cover flanges 98 may be omitted.

A pair of holes 100 may be formed in the top wall 90 of the cover 88. These holes 100 may be threaded to receive a bolt or similar fastener. The through holes 100 may be initially covered by a plug 102 that includes prongs 104 that flex to engage the through hole 100 in a snap-type engagement. Removing the plugs 102 allows accessories to be attached to the cover 88. As described in more detail with respect to FIGS. 7-12, accessories according to the teachings of the present disclosure include a glass holder, for example a wine glass holder. Alternatively, the accessory may be configured to hold a smartphone or other portable electronic device, such as a tablet. Thus, the adjustable post band 70 is positioned on a support post at a height to serve a decorative function, support attachment of accessories to the support post, and to compress a splitting support post 72.

The band plates 76 and the cover 88 may be made from any suitable material, such as a metallic or polymeric material. According to one embodiment, the band plates 76 and the cover 88 are formed of steel sheet cut in a desired pattern and shaped, for example by bending or stamping, into a desired shape. The steel may coated by painting or powder coating. The surface may be smooth or distressed. Alternatively, band plates 76 and the cover 88 may cast or otherwise molded.

Figure 5:
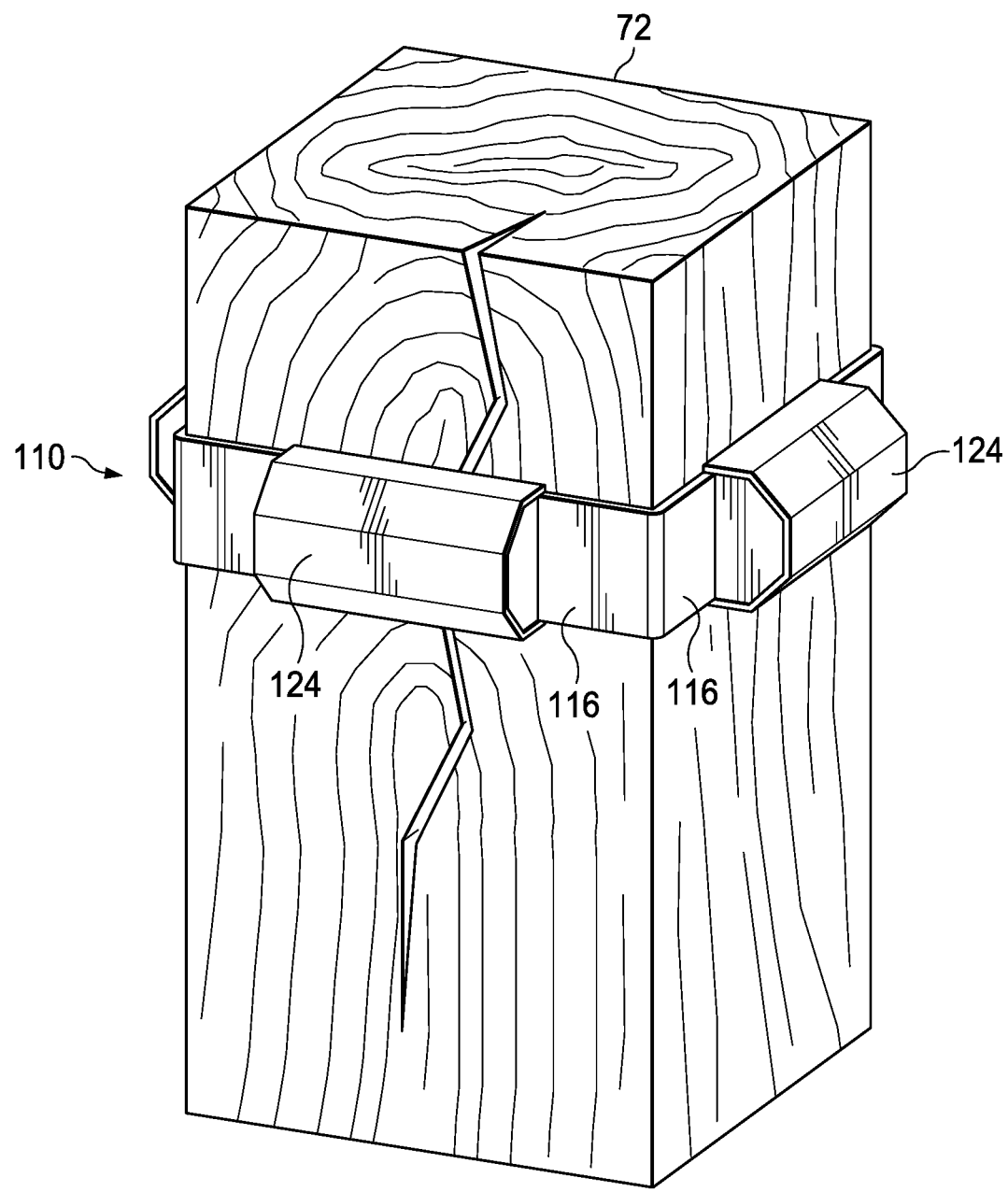
FIG. 5 is an isometric, environmental view of an alternate embodiment of an adjustable post band surrounding a support post.
Figure 6:
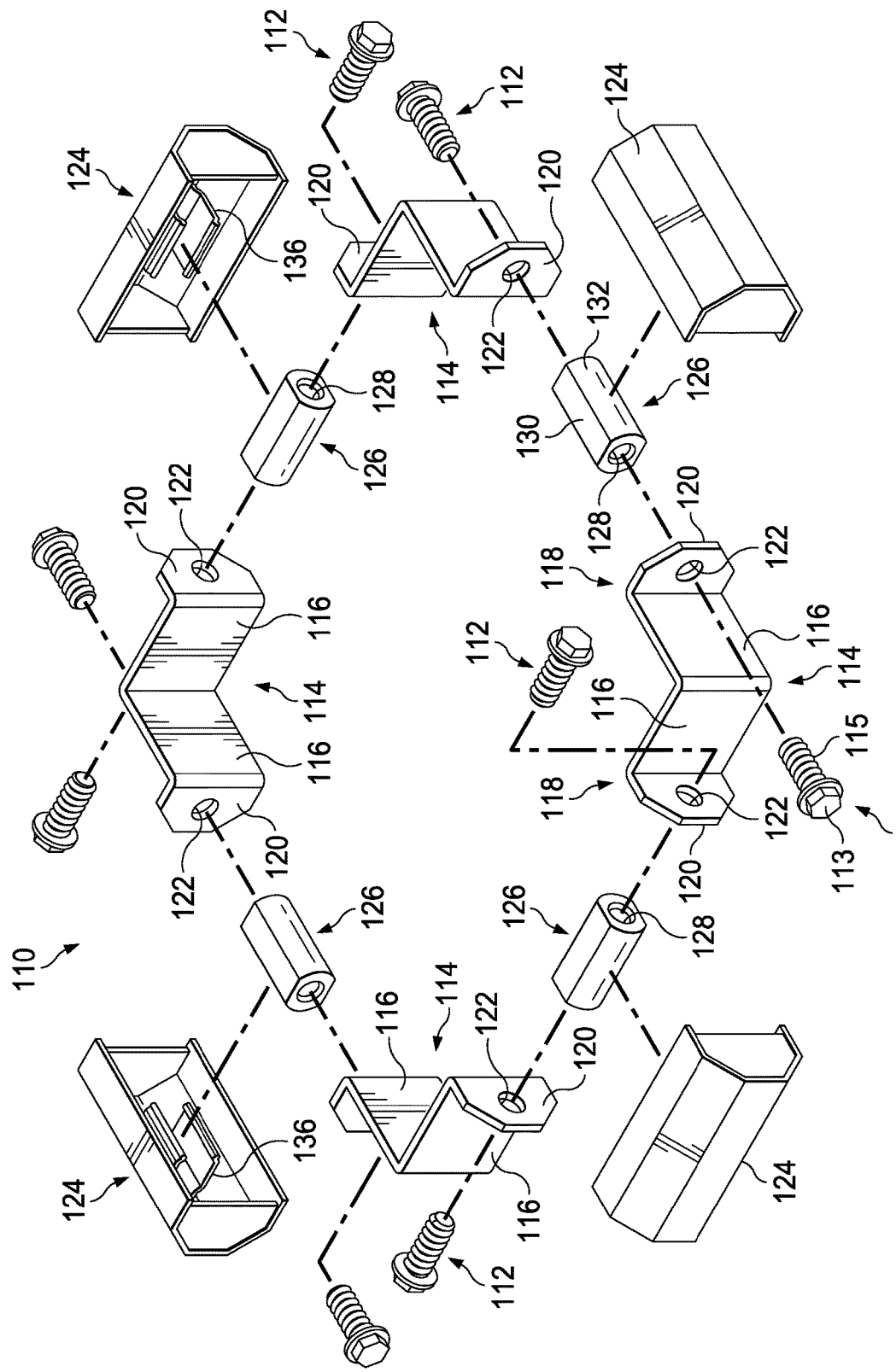
FIG. 6 is an isometric, partially exploded view of the adjustable post band shown in FIG. 5.

FIG. 5 is an environmental view and FIG. 6 is an exploded view of an alternate embodiment of a post band 110 according to the teachings of the present disclosure. The adjustable post band 110 may be used to compress a structural post member 72, for example a six inch by six inch support post for a pergola. Tightening one or more of the bolts 112 of the adjustable post band 110 increases or decreases compression on the structural post 72. Each bolt includes a head 113 and a threaded shaft 115 extending from the head 113. Increasing compression on the support post may be beneficial if the post develops a crack due to lack of moisture or otherwise. Similarly, loosening one or more bolts 112 reduces the compression on the support post 72 created by the adjustable band 110.

The adjustable post band includes four band plates 114. Each band plate 114 includes a primary portion 116 that is bent 90 degrees with the bend disposed equidistant from distal ends 118. A flange 120 extends from each distal end 118 and is bent or otherwise disposed to be orthogonal to the distal end 118 from which it extends. A through hole 122 is formed in each flange 120.

The band plate 114 is sized such that the primary portion contacts a portion of adjacent faces of the support post 72, with the bend contacting an edge at the intersection of one face of the support post 72 with an adjacent face. Any suitable size band plate to accommodate a correspondingly sized support post 72 is contemplated by this disclosure. According to one embodiment, the band plates 114 are symmetrical, and the assembled adjustable post band 110 appears symmetrical, and each cover 124 is positioned approximately equidistant from opposing edges of a face of the support post 72. Four band plates 114 are sized to wrap around the support post 72 and to leave a gap between flanges 120 of adjacent band plates 114. According to an alternate embodiment, the band plate 110 may be arcuate to form a semicircular shape and a pair of band plates are sized and shaped to circumferentially surround a support post having a circular cross section A threaded connector 126 is disposed in the gap between adjacent flanges 120. The threaded connector 126 is formed in a shape of a generally cylindrical tube and includes a threaded through bore 128 extending axially through the tube. An outer surface of the threaded connector includes opposed flat surfaces 130 and opposed arcuate surfaces 132. The flat surfaces 130 may be used for tool engagement (for example, to engage with a clamping tool to secure the threaded connector 126 from turning during assembly or to assist with turning the threaded connector 126 during disassembly).

The threaded connector 126 preferably has mechanical and material properties in accordance with SAE J429 Grade 5 with a proof load of 85,000 psi, a minimum yield strength of 92,000 psi and minimum tensile strength of 120,000 psi, although it will be understood that other mechanical or material properties could be selected based on application.

One bolt 112 is received through the through hole 122 in a flange 120 of a band plate 114, and a second bolt 112 is received through a through hole 122 in a flange 120 of an adjacent band plate 114. Tightening a bolt 112 tends to draw the threaded connector 126 toward the flange 120 through which that bolt 112 extends, and therefore tends to tighten the post band 110.

The bolt 112 preferably has mechanical and material properties in accordance with SAE J429 Grade 8 with a proof load of 120,000 psi, a minimum yield strength of 130,000 psi and minimum tensile strength of 150,000 psi, although it will be understood that other mechanical or material properties could be selected based on application.

A cap or cover 124 is received over a pair of flanges 120 on adjacent band plates 114 and covers the bolts 112, including their respective heads 113, and the threaded connector 126. According to one embodiment, the cover 124 is a hollow structure with a clip 136 extending from an inside surface. The clip 136 is formed of a flexible, resilient material, such a polymeric material or a light gauge metal. The clip 136 flexes to engage the threaded connector 126 and receives the outer surface of the threaded connector 126 including the flat surfaces 130 and one of the arcuate surfaces 132. The cover conceals and hides the hardware and creates an aesthetically pleasing appearance for the post band 70.

Figure 7:
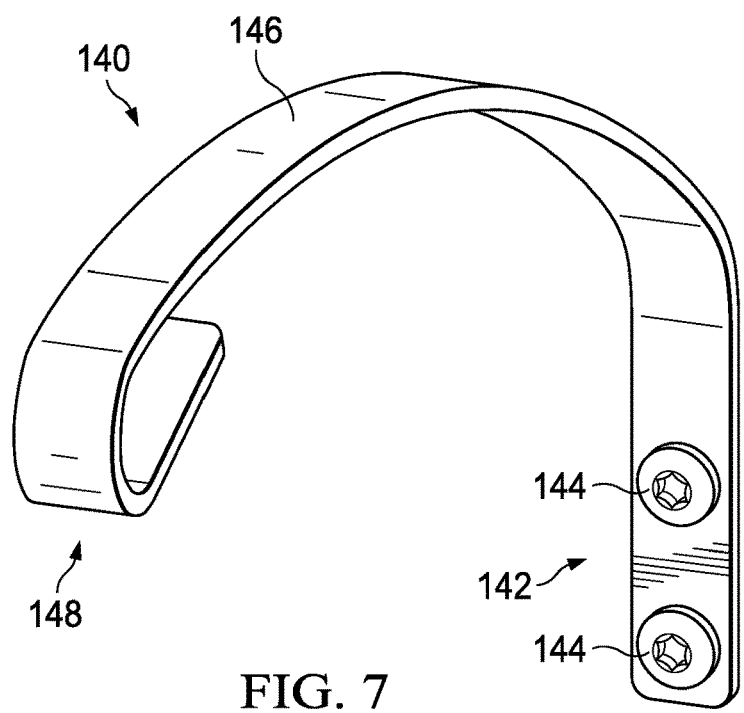
FIG. 7 is an isometric view of an interchangeable accessory configured to be supported by the adjustable post band shown in FIGS. 3-4 that may be particularly useful from which to hang a potted plant.

Reference is made to FIG. 7, which is an isometric view of an accessory 140 configured to be mounted to a cover 88 of the post band 110. The accessory 140 includes a mounting portion 142 with a pair of vertically spaced apart through holes. A fastener 144, such as a screw, is received in each through hole. The fasteners 144 may be captured within the through holes or may be retained in the through holes when the mounting portion 142 is mounted to the cover 88. The fasteners 144 are received in the threaded holes 100 formed in the cover 88 to secure the accessory 140 to the cover 88. Multiple accessories include the same or similar mounting portion 142, through holes, and fasteners 144 such that they are interchangeable. The accessory 140 may be formed of ASTM A36 steel that has a thickness of approximately 0.13 inches.

The accessory shown in FIG. 7 is a plant hanger accessory 140 that cantilevers from the post 72 to allow clearance for a potted plant to hang and be supported by the post band 70. The plant hanger accessory 140 includes an arcuate portion 146 that extends from the mounting portion 142. An open loop 148 is disposed at the distal end of the arcuate portion 146. The open loop 148 receives a mounting element of a potted plant or other ornament. In this manner, a plant is supported by the post band 70 at the height at which the post band 70 is positioned on the post 72. Drive for the fasteners 144 may be provided through hex-head, a slot, cross, Allen-type, star-type, etc.

Figure 8:
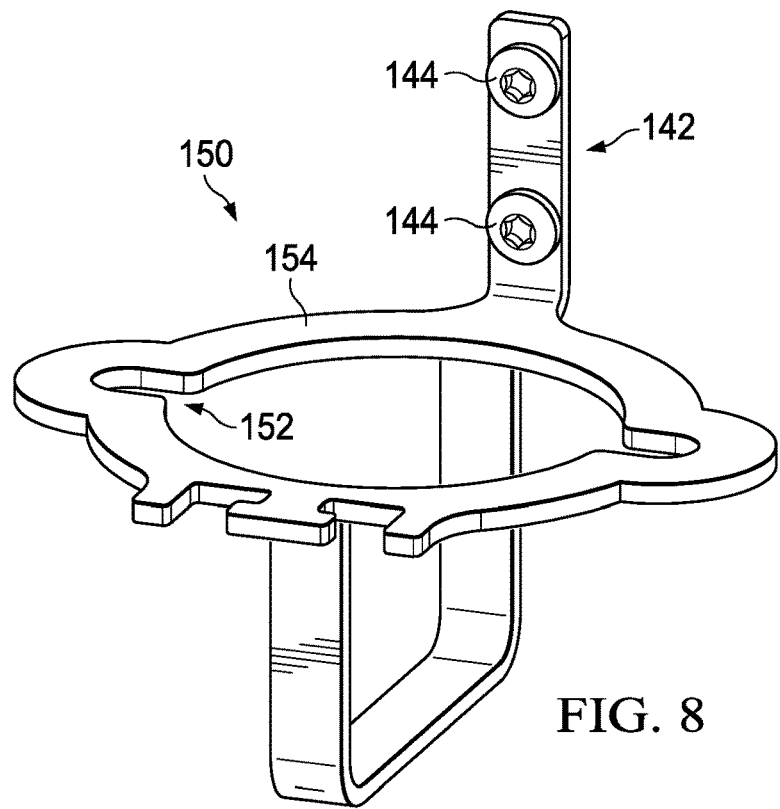
FIG. 8 is an isometric view of an interchangeable accessory configured to be supported by the adjustable post band shown in FIGS. 3-4 that may be particularly useful in holding a canned drink or one or more smartphones.

Reference is made to FIG. 8, which is an isometric view of an interchangeable accessory 150 configured to be coupled to a cover 88 when fasteners 144 are received in the threaded holes 100 of the cover 88. The accessory 150 is sized and shaped to hold a drink can. The accessory 150 also includes opposed slots 152 formed in an annular portion 154. As such, the accessory 150 is also sized and shaped to hold one or more smartphones in a generally upright orientation.

Figure 9:
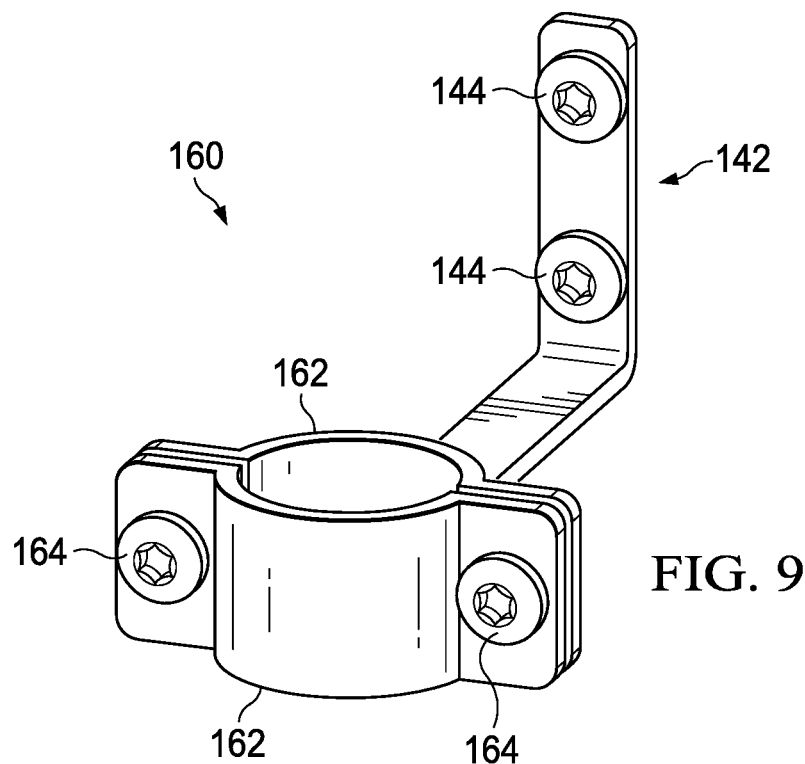
FIG. 9 is an isometric view of an interchangeable accessory configured to be supported by the adjustable post band shown in FIGS. 3-4 that may be particularly useful in supporting and holding a wine bottle.

Reference is made to FIG. 9, which is an isometric view of a further interchangeable accessory 160 with a mounting portion 142 configured to couple to the cover 88, as described above. The accessory 160 is configured to hold a wine bottle. More specifically, a pair of semicircular plates 162 connect via fasteners 164. The connected semicircular plates 162 are configured to surround and support a neck of a wine bottle. Alternatively, the semicircular plates 162 may be welded together or otherwise formed as a generally unitary structure.

Figure 10:
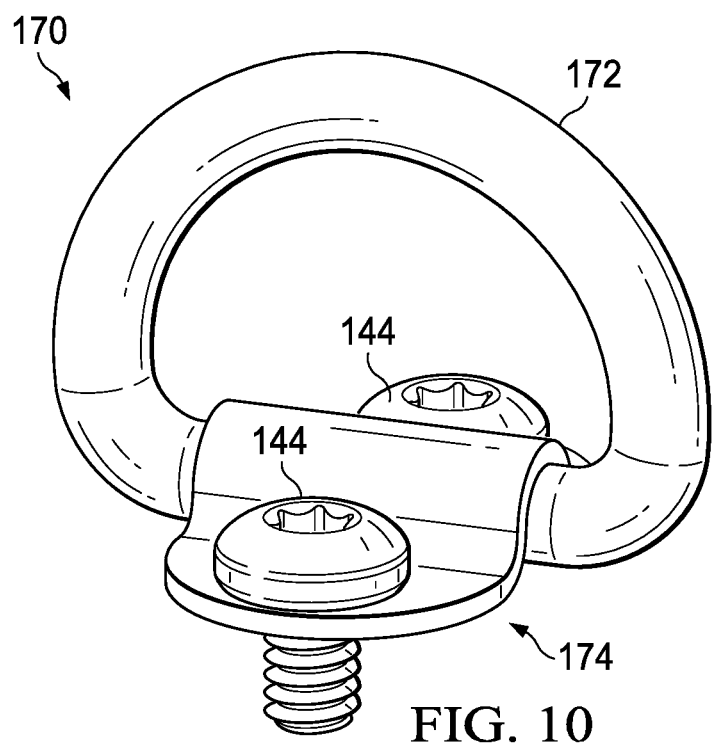
FIG. 10 is an isometric view of an interchangeable accessory configured to be supported by the adjustable post band shown in FIGS. 3-4 in the form of a loop.

Reference is made to FIG. 10, which is an isometric view of a further embodiment of an interchangeable accessory 170 configured to couple with the threaded holes 100 of a cover 88 of the post band 70. A loop 172 is welded or otherwise secured to a mounting portion 174. The mounting portion 174 is similar to the mounting portion 142 described above in that it includes a pair of spaced apart through holes and fasteners 144 that are configured to be received in threaded engagement with the threaded holes 100 of the cover 88. The mounting portion is bent to conform to a portion of the loop 172. According to an alternate embodiment, the loop 172 is pivotable within the mounting portion 174.

Figure 11:
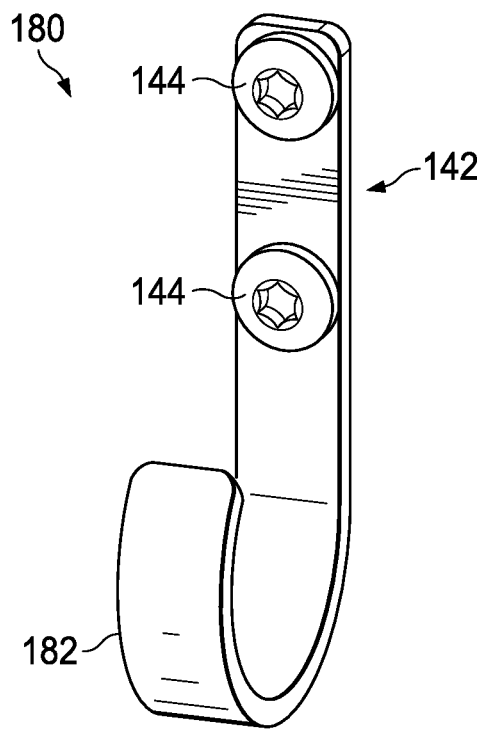
FIG. 11 is an isometric view of an interchangeable accessory configured to be supported by the adjustable post band shown in FIGS. 3-4 that may be particularly useful from which to hang a towel.

FIG. 11 illustrates a further embodiment of an interchangeable accessory 180. The interchangeable accessory includes a mounting portion 142 and fasteners 144 configured to be coupled to the threaded holes 100 of the cover 88. A hook portion 182 extends from the mounting portion 142. The hook portion may be particularly suitable for hanging one or more towels.

Figure 12:
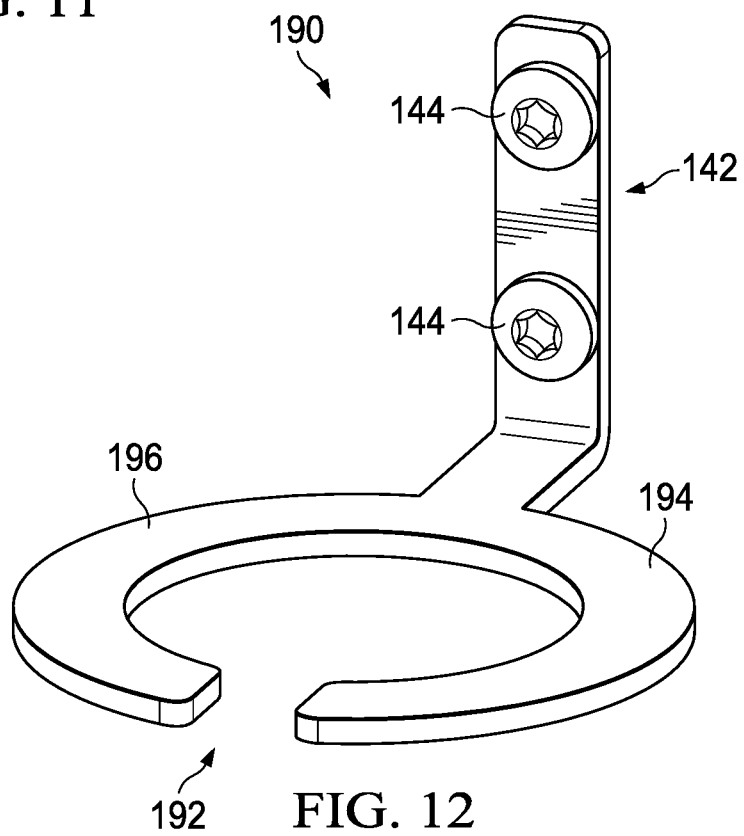
FIG. 12 is an isometric view of an interchangeable accessory configured to be supported by the adjustable post band shown in FIGS. 3-4 that may be particularly useful in holding a wine glass.

Reference is made to FIG. 12, which is an isometric view of a further embodiment of an interchangeable accessory 190 that includes a mounting portion 142 with fasteners 144 configured to couple to the threaded holes 100 of the cover 88. The accessory 190 is configured to receive a stem of a wine glass through an opening 192 in an annular portion 194 extending from the mounting portion 142. An upper surface 196 of the annular portion supports the bulb of the wine glass.

Each of the interchangeable accessories may be formed from any suitable material, such as stainless steel, aluminum, or other metallic material. The metallic material may be bent, stamped, cast, and/or welded in the configurations shown and described. Alternatively, the interchangeable accessories may be formed from a polymeric material and may be molded or formed by known polymeric forming processes. The accessories may be powder coated a variety of colors, including black.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A tie assembly, comprising:
    a first tie plate comprising a first mounting portion and a first flange disposed orthogonally to the first mounting portion, the first mounting portion defining at least one first mounting hole, the first flange defining a first through hole having threads;
    a second tie plate comprising a second mounting portion and a second flange disposed orthogonally to the second mounting portion, the second mounting portion defining at least one second mounting hole, the second flange defining a second through hole;
    a cover receiving the first flange and the second flange and defining a third through hole; and
    a bolt having a shaft and a head, the shaft received by the first through hole, the second through hole, and the third through hole, the shaft including shaft threads in threaded engagement with the threads of the first through hole.

2. The tie assembly of claim 1 wherein the first and second tie plates are each L-shaped.

3. The tie assembly of claim 1 wherein the cover comprises a first cover flange extending in a first direction and configured to span a butt joint of a pair of structural members and a second cover flange extending in a second direction opposite the first direction and configured to span the butt joint.

4. A post band, comprising:
    a first band plate comprising a first primary portion and a first flange defining a first through hole disposed orthogonally to the first primary portion and a second flange defining a second through hole disposed orthogonally to the first primary portion, the first primary portion having a bend disposed between the first flange and the second flange, the first primary portion configured to contact a structural member;
    a second band plate comprising a second primary portion and a third flange defining a third through hole disposed orthogonally to the second primary portion and a fourth flange defining a fourth through hole disposed orthogonally to the second primary portion, the second primary portion having a bend disposed between the third and fourth flanges; the second primary portion configured to contact the structural member;

a cover receiving the first flange of the first band plate and the third flange of the second band plate; and a bolt received through the first through hole, wherein tightening the bolt tends to draw the second band plate towards the first band plate.

5. The post band of claim 4 further comprising a threaded connector configured to be disposed between the first and third flanges, the threaded connector defining a threaded axial through bore configured to threadedly engage the bolt.

6. The post band of claim 5 wherein the cover comprises a clip extending from an inner surface of the cover, the clip configured to partially receive the threaded connector.

7. The post band of claim 4 wherein the cover includes a pair of spaced apart threaded through holes.

8. The post band of claim 7 further comprising an interchangeable accessory comprising a mounting portion supporting fasteners configured to engage the respective threaded through holes in the cover.

9. The post band of claim 8 wherein the interchangeable accessory includes a loop portion.

10. The post band of claim 8 wherein the interchangeable accessory includes a hook portion.

11. The post band of claim 8 wherein the interchangeable accessory includes an annular portion.

12. The post band of claim 11 wherein the annular portion includes an opening configured to receive a stem of a wine glass.

13. The post band of claim 12 wherein the annular portion is closed and configured to receive a body of a drink can.

\* \* \* \* \*